(12) United States Patent
Andersen

(10) Patent No.: US 7,328,790 B2
(45) Date of Patent: Feb. 12, 2008

(54) BOOK WITH CD HOLDER

(75) Inventor: Ashley Andersen, Atlanta, GA (US)

(73) Assignee: Trudy Corporation, Norwalk, CT (US)

( * ) Notice: Subject to any disclaimer, the term of this patent is extended or adjusted under 35 U.S.C. 154(b) by 522 days.

(21) Appl. No.: 10/814,455

(22) Filed: Mar. 31, 2004

(65) Prior Publication Data

US 2004/0188283 A1 Sep. 30, 2004

Related U.S. Application Data

(60) Provisional application No. 60/458,927, filed on Mar. 31, 2003.

(51) Int. Cl.
*B65D 69/00* (2006.01)

(52) U.S. Cl. ............... 206/232; 206/308.1; 283/64; 281/29

(58) Field of Classification Search ........ 206/232, 206/308.1, 311, 312, 472; 283/64; 281/29, 281/31
See application file for complete search history.

(56) References Cited

U.S. PATENT DOCUMENTS

| | | | |
|---|---|---|---|
| 930,290 A | 8/1909 | Hohn | |
| 2,088,953 A | 8/1937 | Greer | |
| 2,866,541 A * | 12/1958 | Ravis | 206/313 |
| 3,964,770 A | 6/1976 | Abildgaard et al. | |
| 4,355,822 A | 10/1982 | McHugh | |
| 4,463,850 A * | 8/1984 | Gorog | 206/309 |
| 4,640,413 A * | 2/1987 | Kaplan et al. | 206/232 |
| 5,088,599 A * | 2/1992 | Mahler | 206/308.1 |
| 5,193,681 A | 3/1993 | Lievsay | |
| 5,199,743 A | 4/1993 | Rosinski, III | |
| 5,234,108 A | 8/1993 | Jorgensen | |
| 5,641,063 A | 6/1997 | Gambardella et al. | |
| 5,667,064 A | 9/1997 | Bauman | |
| 5,682,990 A | 11/1997 | Schluger | |
| 5,947,279 A | 9/1999 | Lee et al. | |
| 6,032,795 A | 3/2000 | Ehrlund et al. | |
| 6,036,008 A | 3/2000 | Hutton | |
| 6,045,161 A | 4/2000 | Ashcraft et al. | |
| 6,086,105 A | 7/2000 | Woldenberg et al. | |
| 6,109,657 A | 8/2000 | Tan | |
| 6,126,201 A | 10/2000 | Pace et al. | |
| 6,216,863 B1 | 4/2001 | Williamson et al. | |
| 6,287,038 B1 | 9/2001 | Chan | |

(Continued)

FOREIGN PATENT DOCUMENTS

WO PCT/US2004/009819  2/2005

OTHER PUBLICATIONS

Ganeri, Anita; *The Young Person's Guide to the Orchestra*; Harcourt Brace & Company; Copyright © Pavilion Books 1996.

(Continued)

*Primary Examiner*—David T. Fidei
(74) *Attorney, Agent, or Firm*—St. Onge Steward Johnston & Reens LLC

(57) ABSTRACT

A combination book and slideable storage medium holder such as a CD holder received in a cavity of the slideable book cover. The slideable book cover designed to allow the CD holder to slide alternately to enclose or expose the CD that is associated with the book. The slideable book cover further includes a cutout for viewing the CD when the slideable book cover is in the closed position.

34 Claims, 14 Drawing Sheets

U.S. PATENT DOCUMENTS

| | | | |
|---|---|---|---|
| 6,290,060 B1* | 9/2001 | Burtch | 206/312 |
| 6,340,178 B1 | 1/2002 | Nakanishi et al. | |
| 6,360,887 B1 | 3/2002 | Pettey | |
| 6,382,863 B1 | 5/2002 | To et al. | |
| 2003/0018586 A1* | 1/2003 | Krahn | 705/58 |

OTHER PUBLICATIONS

Clary, Mildred; Voake, Charlotte; *George Friedrich Haendel, Decouverte Des Music*, Gallimard Jeunesse Musique; © 2000.

Atkins, Alison; Bolton, Bill; Howarth, Daniel; Irish, Martin; Reeves, Sue; Smith, Jan; *Itsy Bitsy Spider and Other Favorites*; Mother Goose Copyright © Abbey Home Media Group PLC; Book Copyright © 2002 Studio Mouse, LLC; Published by Studio Mouse, LLC.

Du Bouchet, Paule; Sauerwein, Leigh; Corvaisier, Laurent; *L'orchestre, Leo, Marie et l'orchestre*; Gallimard mes Premieres Decouvertes de la Musique.

* cited by examiner

BOOK WITH CD HOLDER

CROSS-REFERENCE TO RELATED APPLICATIONS

Applicant claims priority benefits under 35 U.S.C. §119(e) of U.S. Provisional Patent Application Ser. No. 60/458,927 filed Mar. 31, 2003.

FIELD OF THE INVENTION

The invention generally relates to a book that incorporates a compact disk holder in its cover.

BACKGROUND OF THE INVENTION

For many years books have been supplied to the public along with a prerecorded material associated with the book. For example, books have been provided in packaging that also includes audio tapes related to the book. These have proved to be a source of great enjoyment to many and a valuable teaching aid to children.

However, with the advent of newer technologies, the use of storage medium such as Compact Disks, DVDs and other optical and digital storage devices have become favored over the use of tapes as a storage medium because of their high storage capabilities, their small size and thin profile, and their long storage life. Although a CD or DVD may have many advantages over other storage means, they are still subject to damage, such as scratching of the optical reading surface, which can render the CD/DVD unusable. Therefore, individual protective cases have become widely utilized to protect the CD/DVD from damage. However, when books are sold in conjunction with a CD/DVD(s), often times the book and CD/DVD case(s) become separated from each other, especially with frequent use by, for example, young children.

Alternatively, especially with respect to book/CD or book/DVD combinations, a large case having a separate place for the book and the CD(s) to be located inside have been utilized. While this has provided some protection for the CD(s), the case has necessarily been proportionately large so that the book and the CD(s) can all fit inside. This is especially so with children's books that may comprise, for instance, large board pages. However, having a very large case is undesirable in many instances because these large cases cannot fit on standard sized bookshelves. Another drawback of the large cases is that the CD/DVD(s) are not visible when the case is closed. This can be a drawback, especially when dealing with children's books, because children frequently forget to put items they are using away. The case may simply be closed and there is nothing the child can see that indicates that the CD(s) are not put away.

Alternatively, is has been known to affix a case to the inside cover of a book in which a CD/DVD(s) may be placed. These cases have, frequently comprised a paper or a flexible plastic material. However, these cases may not fully enclose and protect the CD/DVD(s) and these types of cases generally do not stand up to frequent and repeated use without degrading significantly. In addition, while these types of cases may eliminate the need for a large case, this has also tended to damage the book such that when the cover of the book is closed with the CD(s) inserted therein, the binding of the book is pulled apart. This is undesirable because the life of the book is severely degraded with use of the book. This is especially so with children's books in which frequently a child will read along in the book while listening to the CD(s) numerous times, sometimes on a weekly or even a daily basis. This configuration also has the same drawback as previously stated, namely, the CD(s) are not visible when the book is closed.

Therefore, what is desired is an apparatus that combines a book and CD/DVD holder or compartment for holding a digital media storage format, to effectively protect the storage medium from damage while at the same time comprises a compact profile.

It is also desired to provide an apparatus that combines a book and CD(s) holder that will facilitate ease of packaging the book with the CD(s).

It is further desired to provide an apparatus that combines a book and CD(s) holder that will be durable and not degrade significantly with repeated use.

It is further desired to provide an apparatus that combines a book and CD(s) holder that will resist damage to the CD(s) due to, for instance, deformation of the cover and binding.

It is still further desired to provide an apparatus that combines a book and CD(s) holder that will visually allow an individual to determine if the CD(s) are placed in the CD(s) holder when closed.

SUMMARY OF THE INVENTION

These and other objects of the invention are achieved in one advantageous embodiment where a CD/DVD holder is incorporated directly into a sliding component of the cover of a book.

The invention may include, for instance, a book with a front cover that is formed in multiple pieces such that it can be slid from a closed to an open position to access the CD(s) or other digital storage mediums. Alternatively, a tray comprising the CD/DVD compartment may be slid in and out of one piece of the book cover to expose the CD/DVD. In an interior cavity of the cover is located a CD/DVD holder for holding a CD/DVD that may be related to the book in which it is found. The book cover may be slid open by moving a portion of the cover away from the binding of the book to permit access to the CD stored inside. Various other embodiments may have the CD(s) held in a separate CD holding tray enclosed by the other cover portions.

The book cover enclosing the CD(s), or other digital storage medium, is bound to the common binding to which the other book pages are bound. The slideable portion of the cover that is slid open can be any portion of the front cover from a small portion along the edge of the book up to almost the entire cover along the binding. For instance, various embodiments illustrated in the drawings show covers where approximately half the portion of the cover is slid open, or where a substantial majority of the cover is slid open. When open, the cover permits access to permit removal of the CD(s) or other digital storage medium. Alternatively, other embodiments have a tray-like component that can be slid open from the top, side or bottom of the front or back cover of the book.

The book cover may also include cutouts that permit viewing of the CD(s) in the holder when the book cover portions are in a closed position. The cutouts may be entirely within a single portion of the cover or be comprised of partial openings in different cover portions, which come together at a seam to form a single opening. In addition, multiple cutouts in each cover may also be used. These cutouts provide the user with the ability to quickly and immediately determine if a CD(s) is contained in the book.

The opening also permits the CD and any artwork on the CD to become part of and incorporated into the overall graphic design of the book cover.

In one advantageous embodiment a Compact Disk holding apparatus is provided comprising, a Compact Disk holder for receiving at least one Compact Disk, and a book cover having an interior cavity for receiving the Compact Disk holder. The book cover or a portion of the book cover is provided being slideable along a direction of movement such that when the book cover is displaced to an open position relative to the Compact Disk holder, the at least one Compact Disk is accessible for removal from the Compact Disk holder and when the book cover is displaced to a closed position, the Compact Disk holder is received in the interior cavity of the book cover.

In another advantageous embodiment, a Compact Disk holding apparatus is provided comprising, a Compact Disk holder for receiving at least one Compact Disk. The apparatus comprises a book cover having a first part connected at one side to a binding of a book and having the Compact Disk holder slideably attached thereto, the first part having an interior cavity for receiving at least a portion of the Compact Disk holder therein. The book cover also has a second part having the Compact Disk holder slideably attached thereto, the second part having an interior cavity for receiving at least a portion of the Compact Disk holder therein. The apparatus is provided such that the Compact Disk holder is slideable along a direction of movement relative to the first cover part and the second cover part is slideable along direction of movement relative to the Compact Disk holder such that when the second cover part and the Compact Disk holder are displaced to an open position, the Compact Disk is accessible for removal from the Compact Disk holder and when the second part and the Compact Disk holder are displaced to a closed position, the Compact Disk is received in the interior cavities of both the first and the second parts.

In another embodiment, the book cover had an interior cavity that contains a CD/DVD holder or tray. The holder can be slid relative to the cover from a closed to open position to allow removal from the holder or tray. The holder or tray once slid to an open position to provide access to the tray also provides sufficient access to allow the CD/DVD to be replaced in the tray or holder after use of the CD/DVD and the holder or tray slid back to a closed position.

In another advantageous embodiment, a Compact Disk holding apparatus comprising, a Compact Disk holder for receiving at least one Compact Disk and a book cover. The book cover has a first part connected at one side to a binding of a book and having the Compact Disk holder attached thereto. The book cover also has a second part having the Compact Disk holder slideably attached thereto, the second part having an interior cavity for receiving at least a portion of the Compact Disk holder therein. The apparatus is further provided such that the second part is slideable along a direction of movement relative to the Compact Disk holder such that when the second part is displaced to an open position, at least one Compact Disk is accessible for removal from the Compact Disk holder and when the second part is displaced to a closed position, at least one Compact Disk is received in the interior cavity of the second part.

The invention and its particular features and advantages will become more apparent from the following detailed description considered with reference to the accompanying drawings.

DETAILED DESCRIPTION OF THE DRAWINGS

Figure 1:
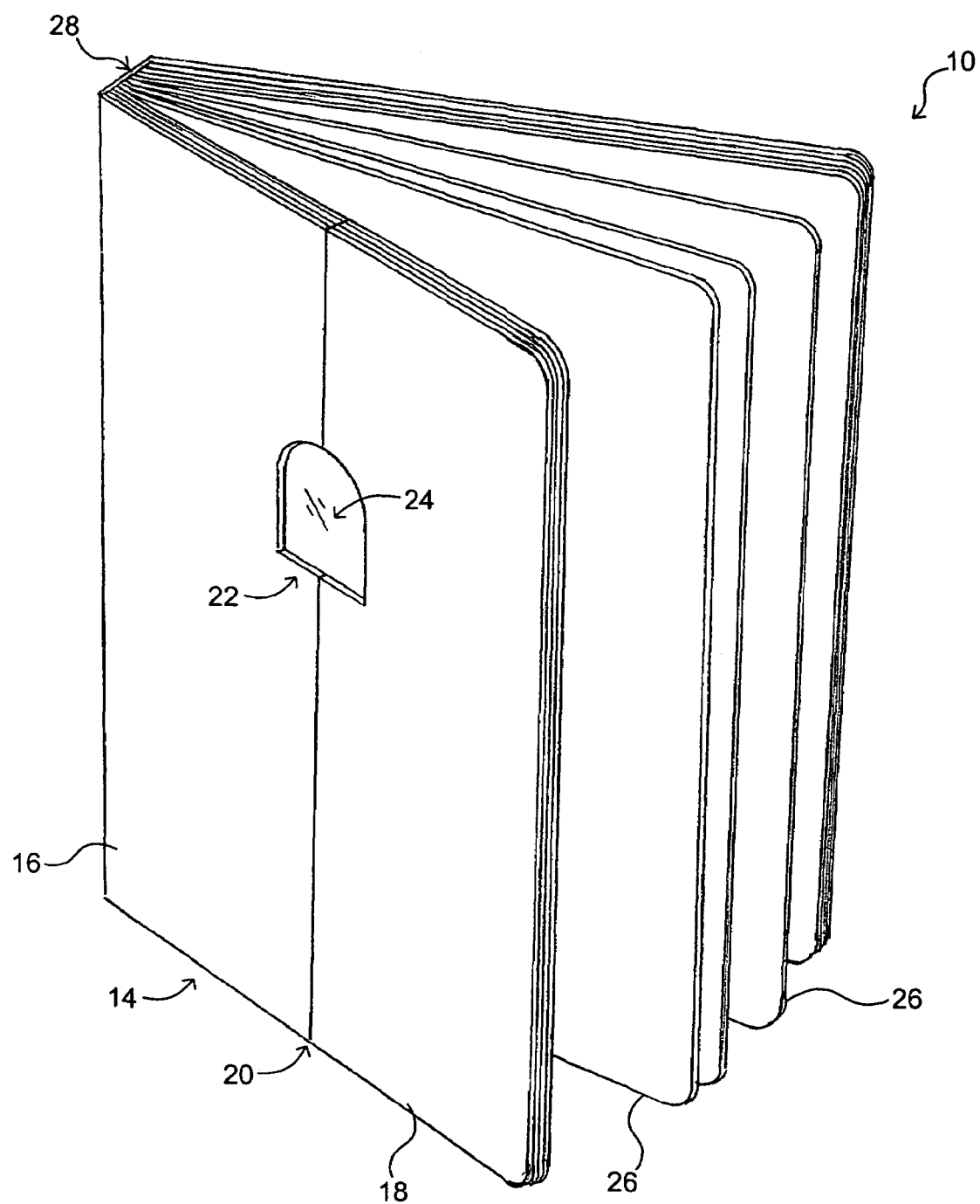
FIG. 1 is an illustration of one embodiment of the present invention showing the slideable book cover fully contracted in the closed position.

FIG. 1 illustrates a book 10 with an integral CD holder 12 according to one advantageous embodiment of the present invention. Book 10 is illustrated with slideable cover 14 in a closed position.

Slideable cover 14 is made up of a first part 16, which is attached at one end to the binding of the book 10. Slideable cover 14 is also made up of a second part 18, which forms a seam 20 where an edge of first part 16 and second part 18 meet. It is contemplated however, that the first part 16 and the second part 18 do not need to touch one another when the slideable cover 14 is in a closed position. Rather a gap may be left between the first part 16 and the second part 18 when the slideable cover 14 is in a closed position.

Also illustrated in FIG. 1 is cutout 22 located partially in first part 16 and partially in second part 18. When the slideable cover 14 is closed, a CD 24 or other storage medium is visible through cutout 22. In this manner, an individual may quickly determine if the CD 24 is put away in CD holder 12. While the cutout 22 is illustrated in FIG. 1 as a window with a rounded top and straight sides and bottom, it is contemplated that any particular shape for cutout 22 may be utilized or multiple cutouts can be used.

Typically, CD 24 is provided with an optically readable side (toward the book) and a non-optically readable side, which may indicate what information is stored on the disk. It is contemplated that indicia related to the book 10 that CD 24 is associated with may be placed on the non-optically readable side of CD 24 such that it may be seen through cutout 22 thereby adding to the artistic look of the book 10.

It is still further contemplated that indicia may be placed on CD holder 12 such that, when CD 24 is removed from CD holder 12, the indicia may be seen.

As is illustrated in FIG. 1, book 10 includes pages 26. Pages 26 may comprise paper or other materials such as stiff board material as is commonly used in children's books. Pages 26 are bound together with binding 28. Although pages 26 and second part 18 of slideable cover 14 are illustrated with rounded corners, this is not necessary and may comprise any desired shape. Further, although slideable cover 14 is shown as having the same dimensions as pages 26, this is not necessary as slideable cover 14 may comprise any desired dimensions.

Figure 2:
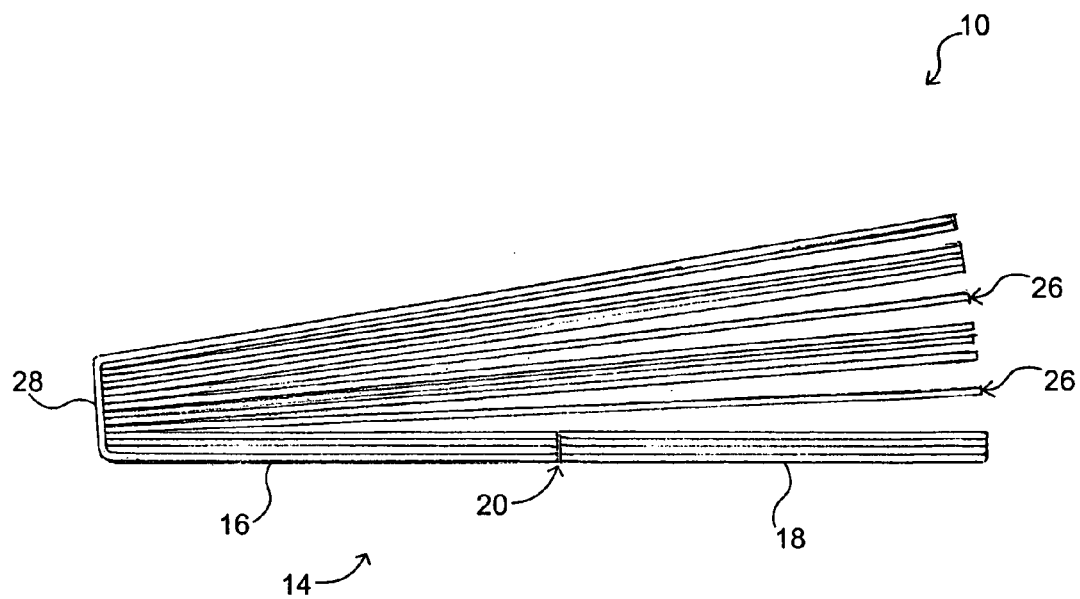
FIG. 2 is a sectional view according to FIG. 1, illustrating a seam created by the slideable cover.

FIG. 2 is a top view of book 10 showing pages 26 and slideable cover 14. As previously mentioned, although pages 26 are illustrated as stiff board material in FIG. 2, they may alternatively comprise paper or any other suitable material. In fact, it is contemplated that the slideable cover 14 may be utilized with any type of bound printed material. The invention contemplates using any type of binding, including but limited to spiral binding, case binding or sewn binding. It can be seen that slideable cover 14 is thicker than individual pages 26. This provides for CD holder 12 to be located inside of slideable cover 14. Again, although only one CD 24 is illustrated in CD holder 12, it is contemplated that more than one CD 24 or storage medium may by contained in CD holder 12, for instance, by a stacking arrangement.

FIG. 2 further illustrates seam 20, showing that first part 16 and second part 18 are completely separate pieces surrounding CD holder 12. In addition, first part 16 of slideable cover 14 is integrally connected with binding 28 further adding to the strength and durability of book 10.

Figure 3:
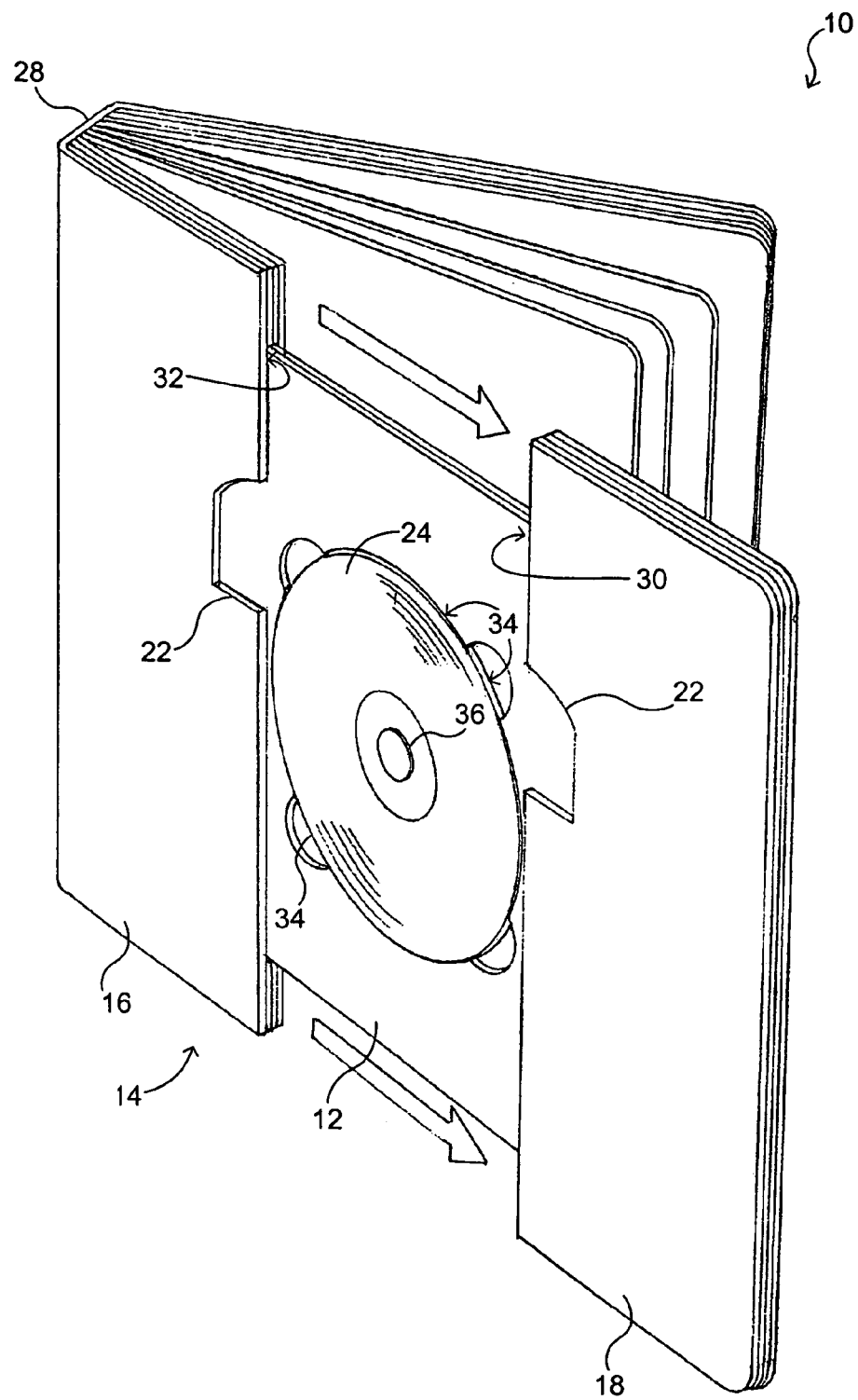
FIG. 3 is an illustration of the slideable book cover according to FIG. 1, showing the slideable book cover and CD holder fully extended to the open position.

FIG. 3 illustrates book 10 with slideable cover 14 in the open position. Slideable cover 14 may be laterally displaced as indicated by the arrows such that CD 24 may be removed. To open slideable cover 14 it is contemplated to laterally pull second part 18 away from first part 16. Second part 18 will move with respect to both first part 16 and CD holder 12 to expose CD 24. Second part 18 will be allowed a maximum lateral displacement exposing the side of CD 24 located in cavity 30 of second part 18, while CD holder 12 will also be allowed a maximum lateral displacement with respect to first part 16 exposing the other side of CD 24 located in cavity 32 of first part 16. Stopping means are provided inside of first part 16 and second part 18 to prevent them from separating from CD holder 12.

The storage medium holder, in this case CD holder 12 comprises a recess 34 for placing CD 24 therein. CD holder 12 further comprises a stem 36 to engaging with a hole located at the center of CD 24 to engagingly hold CD 24 in CD holder 12 via an interference fit.

Slideable cover 14 may further include a fitting to keep first part 16 and second part 18 from inadvertently coming apart and exposing CD 24. The fitting may be located inside of first part 16 and second part 18 and may comprise any type of fitting known to those in the art such as a simple interference fitting or detent, which may be overcome by application of mild lateral force.

CD holder 12 may further comprise any suitable material including but not limited to rigid formed plastic, paper or EVA foam. First part 16 and second part 18 may also be formed of any appropriate rigid material such as a heavy paperboard material or plastic. As CD holder 12 is insertable in cavities 30 and 32, first part 16 and second part 18 may comprise for instance, multiple layers of selected materials that may be assembled and affixed to each other with a suitable adhesive or by any suitable method. Alternatively, first part 16 and second part 18 may comprise formed unitary pieces.

Figure 4:
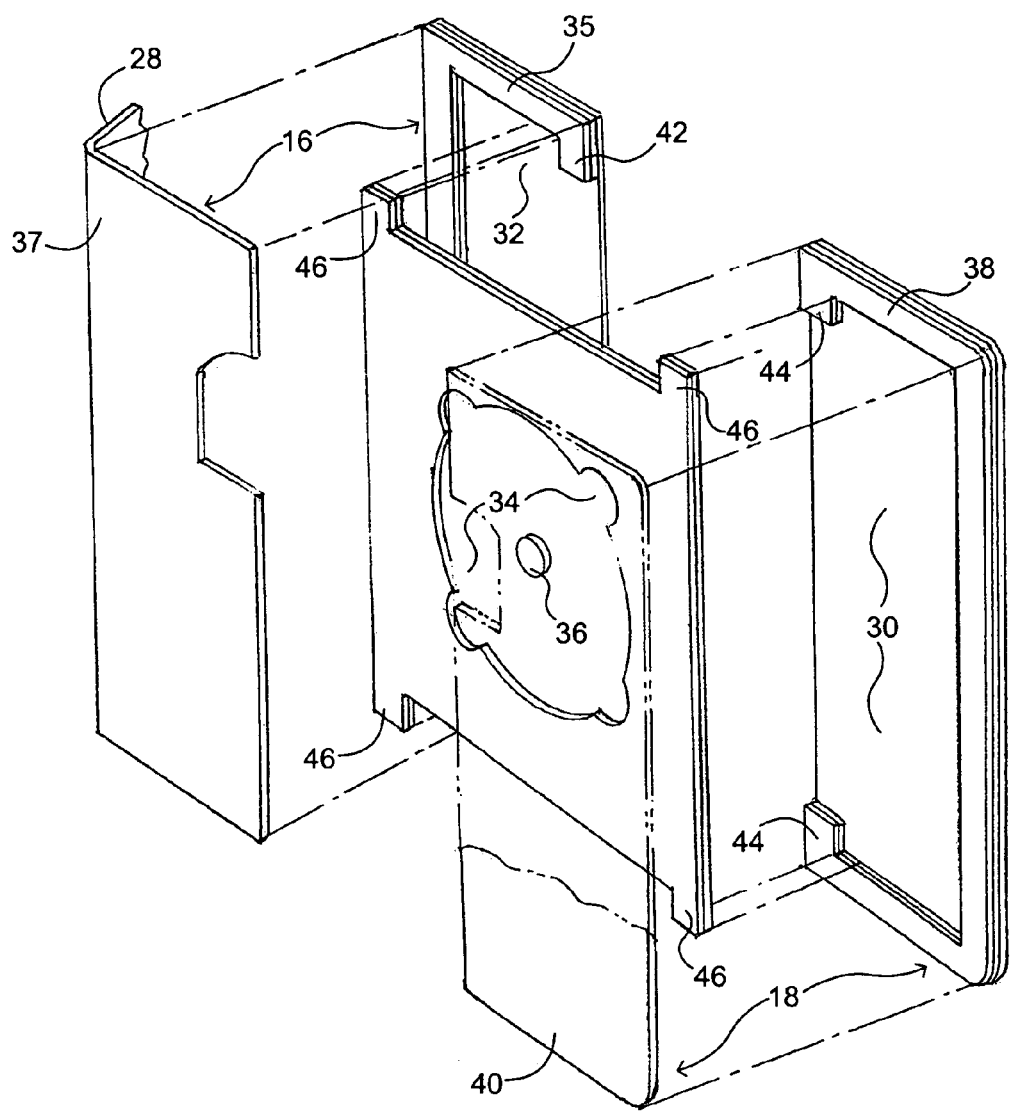
FIG. 4 is an assembly drawing of the slideable book cover according to FIG. 1.

FIG. 4 illustrates an assembly drawing of slideable cover 14. In this embodiment, first part 16 and second part 18 comprise multiple pieces that may be assembled. For instance, first part 16 further comprises base piece 35 and top piece 37, while second part 18 further comprises base piece 38 and top piece 40. Cavities 30 and 32 may clearly be seen in this view.

Both base pieces 34 and 38 are provided with protrusions 42 and 44 respectively which interact with protrusions 46 provided on CD holder 12 to prevent detachment of first part 16 and second part 18 from CD holder 12.

As previously mentioned, base piece 35 and top piece 37 of first part 16, and base piece 38 and top piece 40 of second part 18 may be assembled and affixed to each other with a suitable adhesive or by any suitable method.

Figure 5:
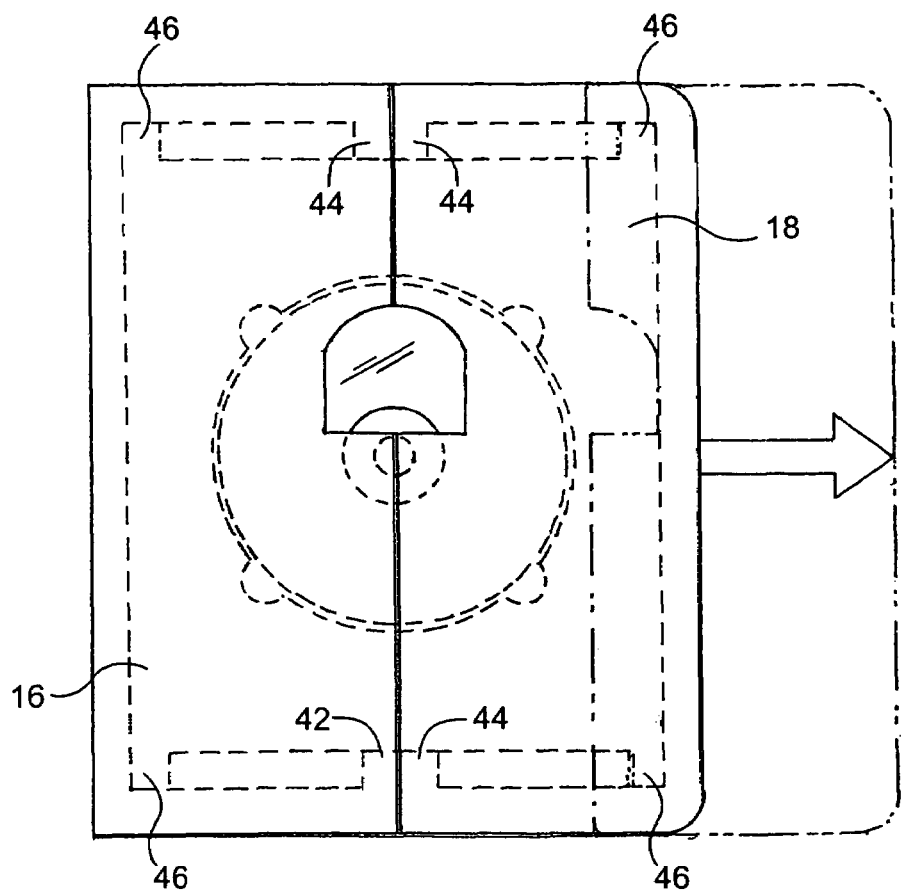
FIG. 5 is a still another illustration of the slideable book cover according to FIG. 1 shown in the closed position, illustrating the interaction of the book cover portions with the CD holder.
Figure 6:
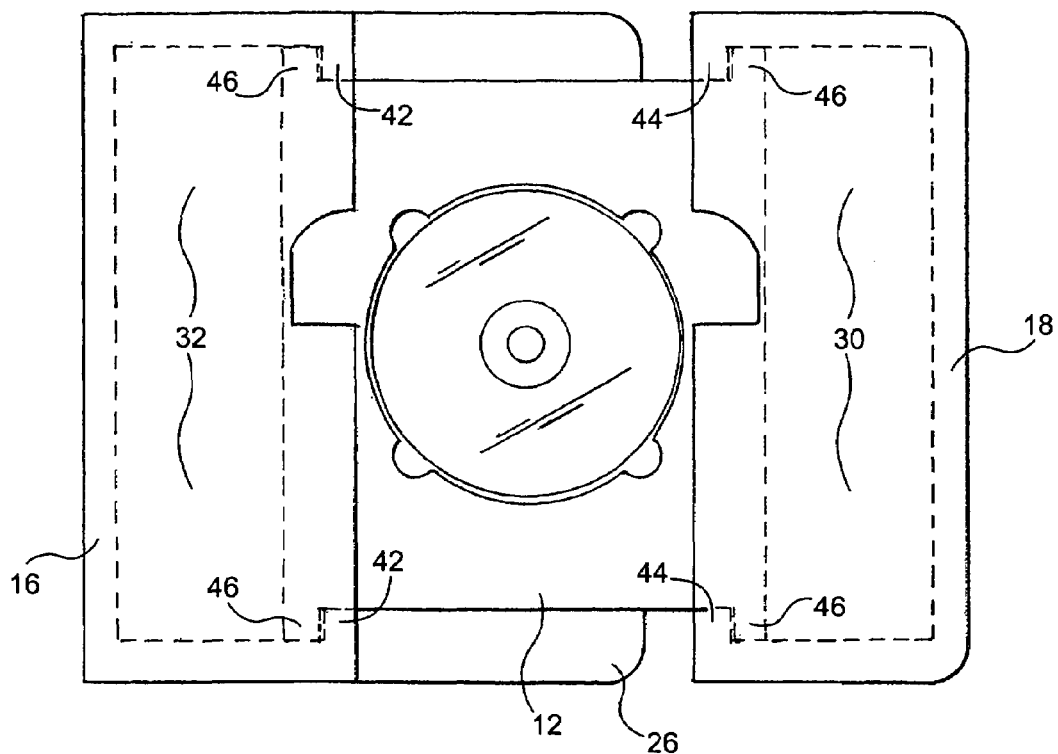
FIG. 6 is a still another illustration of the slideable book cover according to FIG. 1 shown in the open position, illustrating the interaction of the book cover portions with the CD holder.

FIGS. 5 and 6 further illustrate the interaction of protrusions 42 and 44 of first part 16 and second part 18 respectively with protrusions 46 of CD holder 12.

FIG. 5 illustrates slideable cover 14 in the closed position with the arrow indicating that second part 18 may be laterally displaced to expose CD 24 for removal from CD holder 12.

FIG. 6 illustrates slideable cover 14 in the open position with protrusions 42 and 44 of first part 16 and second part 18 respectively interacting with protrusions 46 of CD holder 12 defining a maximum lateral displacement of second part 18 and CD holder 12 allowed.

Figure 7:
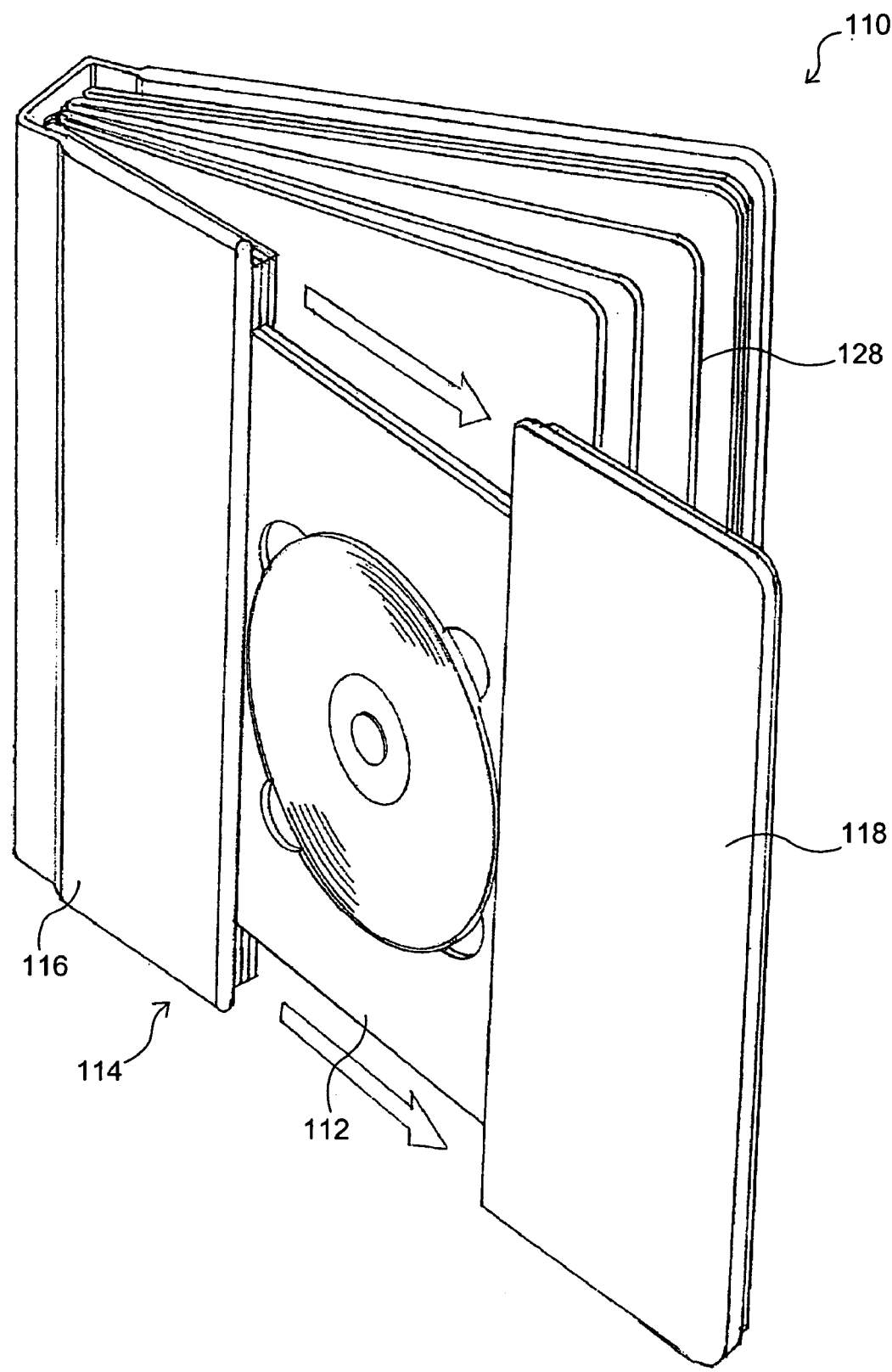
FIG. 7 is an illustration of another advantageous embodiment of the present invention showing the slideable book cover in the open position.
Figure 8:
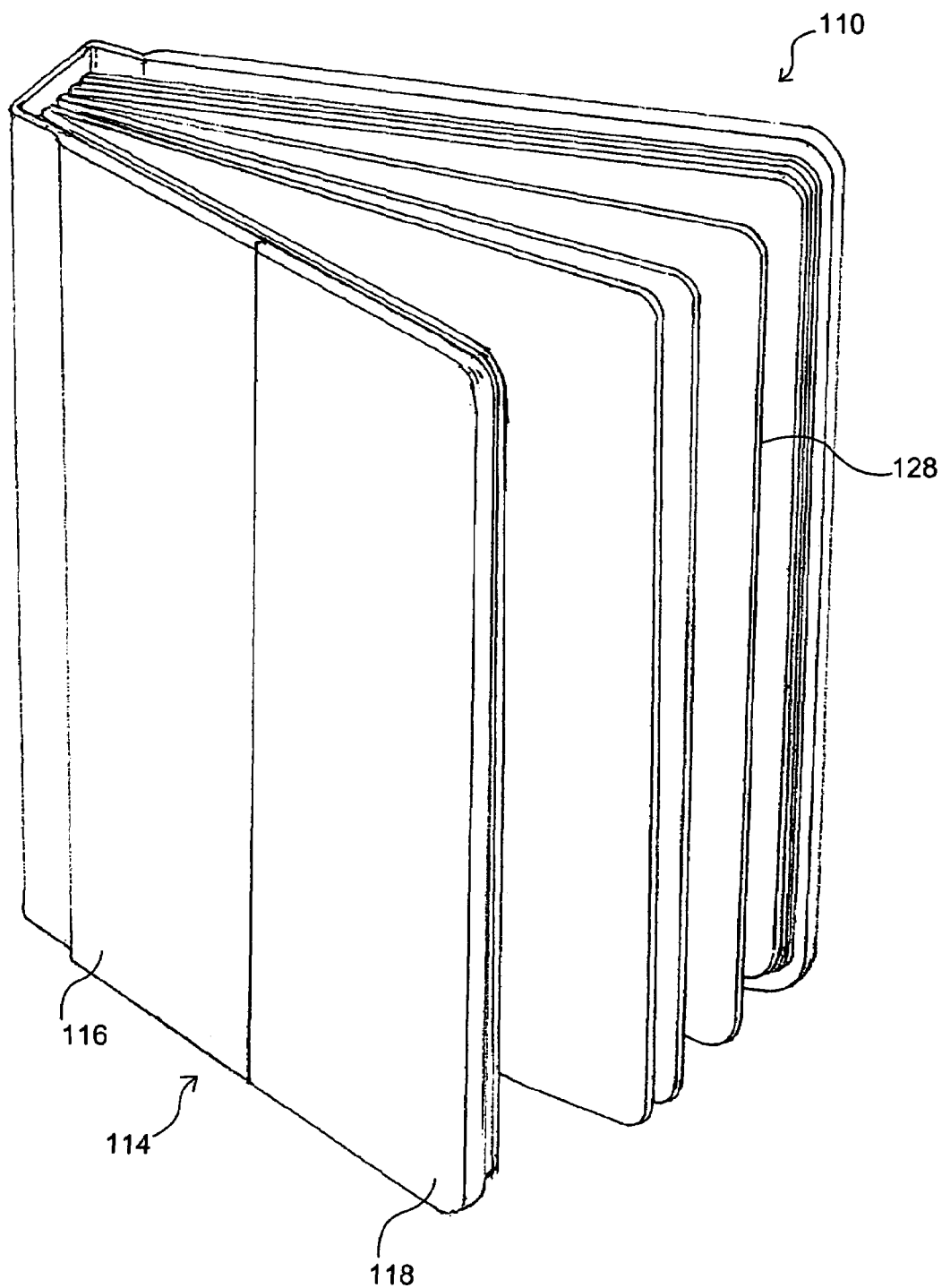
FIG. 8 is another illustration of the slideable book cover according to FIG. 7 shown in the closed position.

FIGS. 7 and 8 illustrate yet another advantageous embodiment of the present invention. FIG. 7 illustrates book 110 with CD holder 112 located therein and slideable cover 114 shown in the open position. Slideable cover 114 comprises first part 116 and second part 118 which generally correspond to first part 16 and second part 18. However, slideable cover 114 is provided such that it is larger in dimension than pages 128. Slideable cover 114 further comprises a rigid board material that is covered by a suitable plastic material, coated paper material or cloth. In addition, a padding is further located between the rigid board material and the plastic, coated paper or cloth covering which offers extra protection to the CD and increases the perceived value of the book.

FIG. 8 illustrates book 110 with CD holder 112 located therein and slideable cover 114 shown in the closed position. As the remaining features of book 110 and slideable cover 114 generally correspond to the description of book 10 and slideable cover 14 discussed in connection with FIGS. 1-6 they will not be re-described here.

Figure 9:
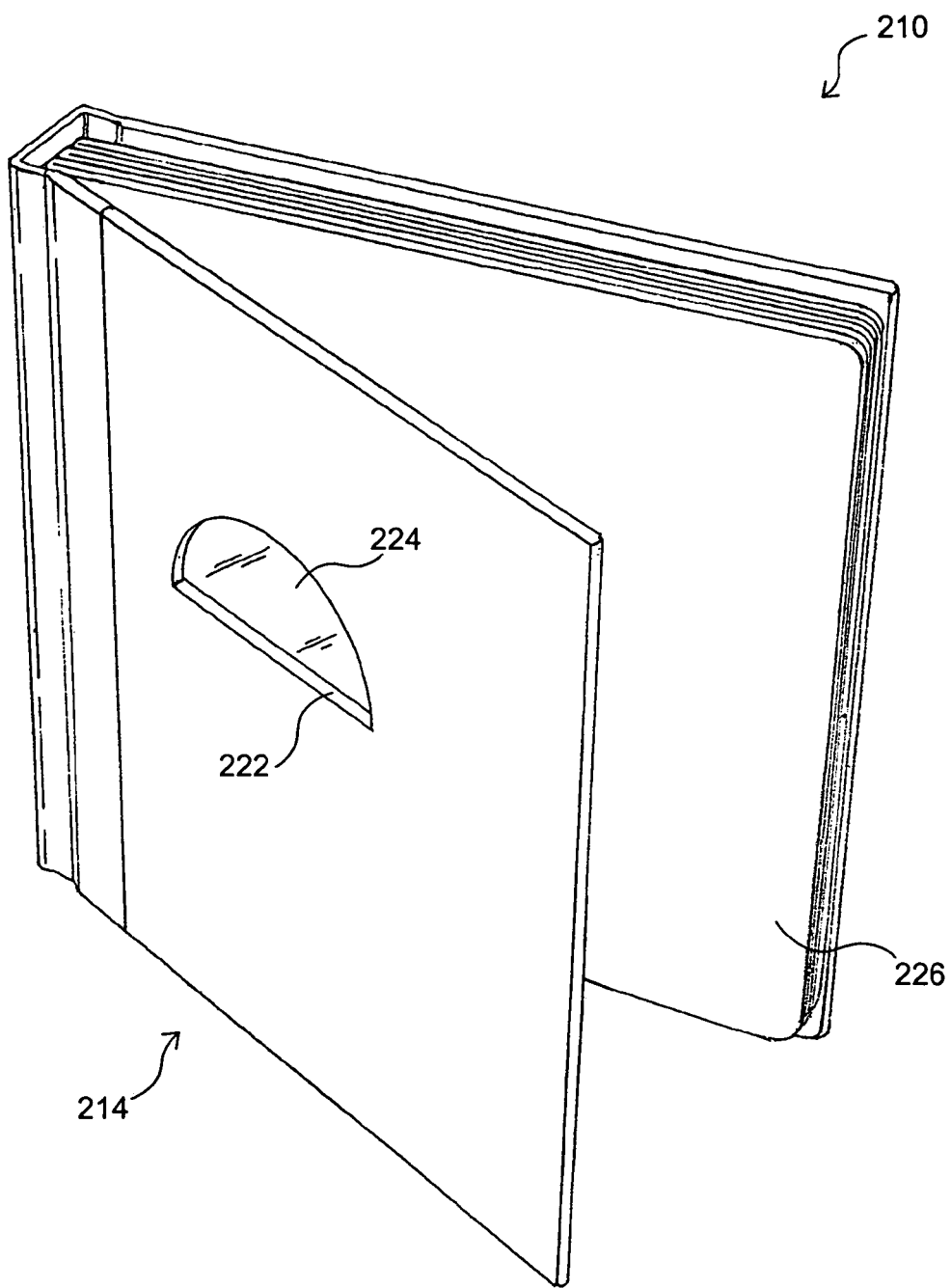
FIG. 9 is an illustration of yet another advantageous embodiment of the present invention showing the slideable book cover in the closed position.
Figure 10:
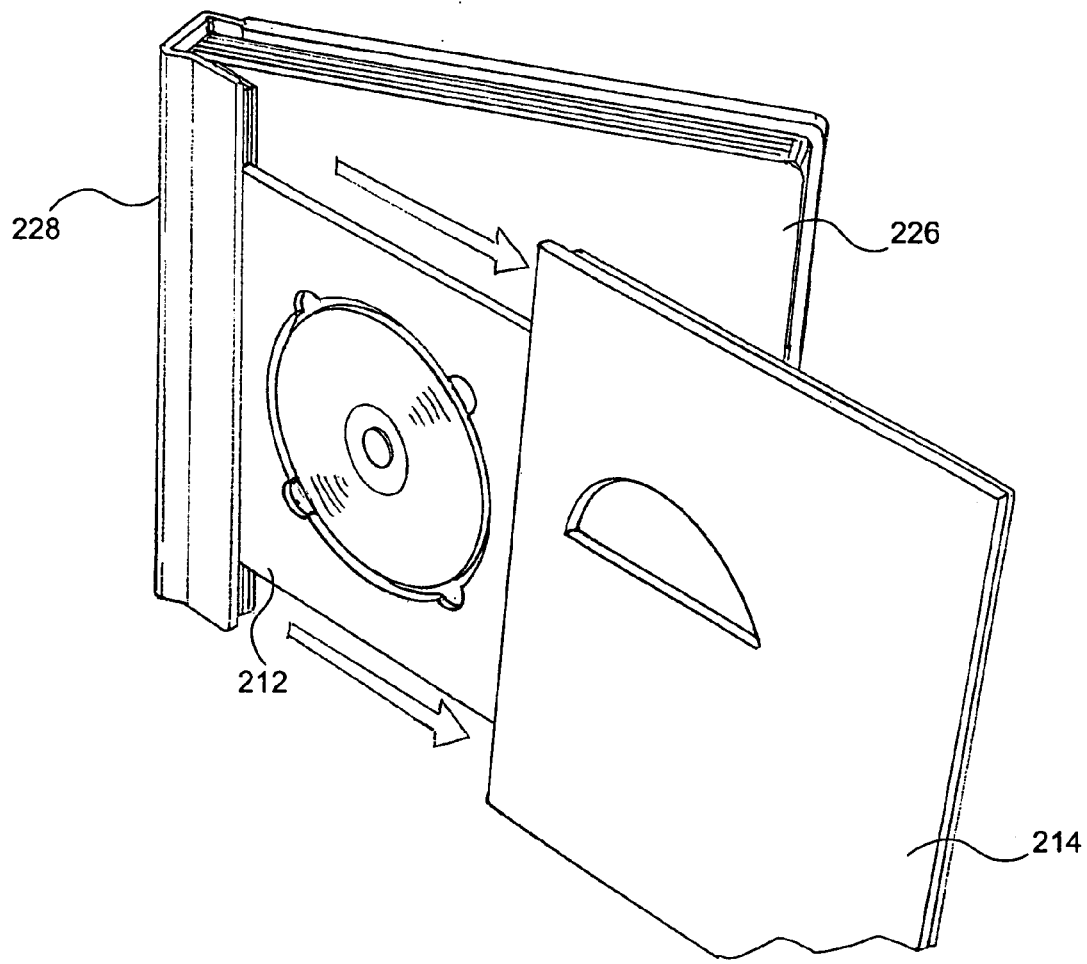
FIG. 10 is another illustration of the slideable book cover according to FIG. 9 shown in the open position.
Figure 11:
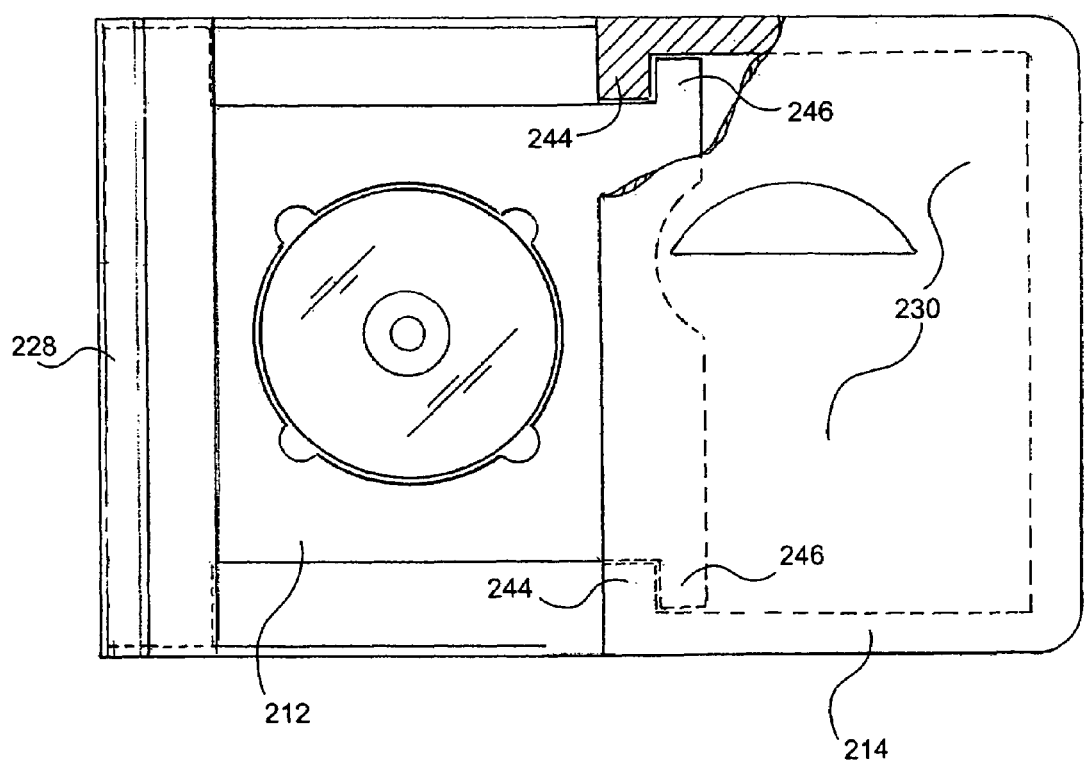
FIG. 11 is a still another illustration of the slideable book cover according to FIG. 9 shown in the open position, illustrating the interaction of the slideable book cover with the CD holder.

FIGS. 9-11 illustrate still another advantageous embodiment of the present invention. FIG. 9 illustrates book 210 with CD holder 212 located therein and slideable cover 214 shown in the closed position. Slideable cover 214 comprises substantially a single piece that is laterally displaceable as indicated by the arrows shown in FIG. 10. As seen in FIG. 10, CD holder 212 is connected at one side to the binding 228 of book 210.

Slideable cover 214 is further optionally provided with cutout 222 such than when slideable cover 214 is in the closed position, CD 224 may be seen through cutout 222. In addition, slideable cover 214 may comprise any suitable rigid material and include a plastic covering and padding located therebetween as desired.

FIG. 11 illustrates the interaction of slideable cover 214 with CD holder 212. CD holder 212 is provided with protrusions 246 which interact with protrusions 244 of slideable cover 214 such that slideable cover 214 and CD holder 212 are engagingly interlocked with each other. Slideable cover 214 is further provided with cavity 230 in which CD holder 212 may be inserted when slideable cover 214 is in the closed position as illustrated in FIG. 9.

In addition, as many of the features of the embodiment illustrated in FIGS. 9-11 correspond to the embodiment described in FIGS. 1-6 they will not be re-described here.

Figure 12:
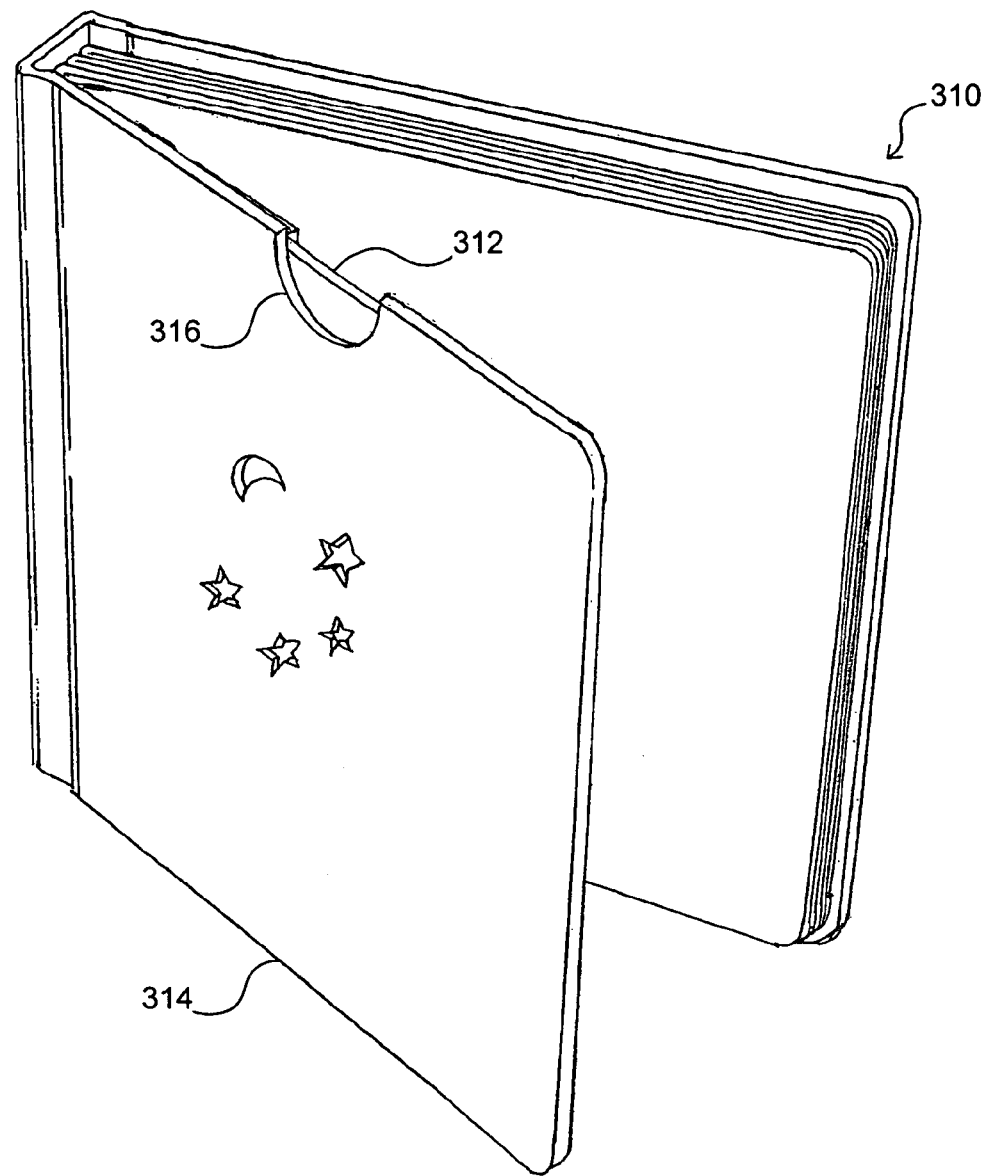
FIG. 12 is a perspective view of another embodiment of the invention with a slideable CD holder in the closed position.
Figure 13:
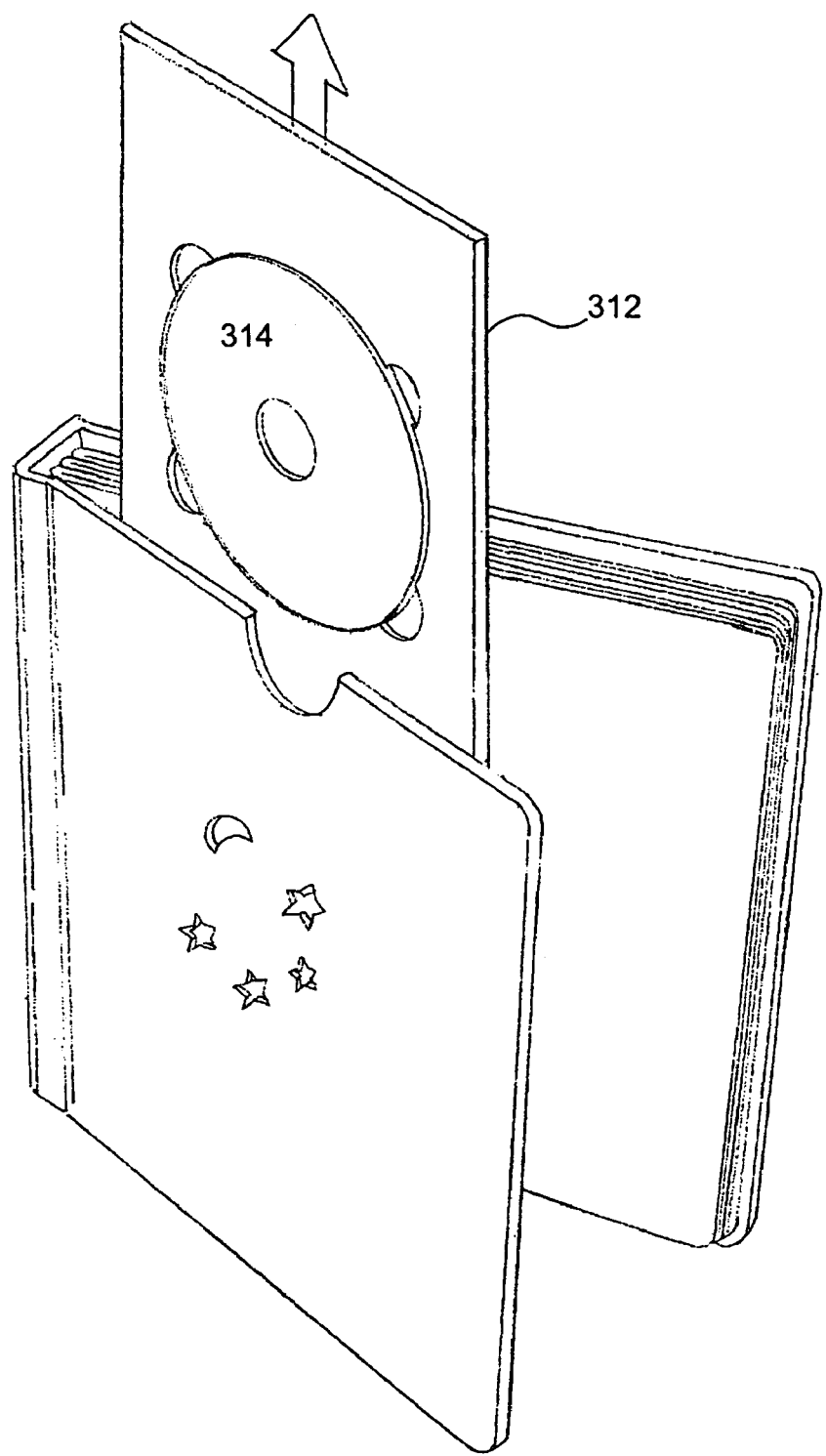
FIG. 13 is a perspective view of the embodiment shown in FIG. 12 showing the slideable CD holder slid to the open position.

FIG. 12 shows yet another embodiment of the invention 310 having a sliding storage medium holder or tray 312 in a closed position inside the cavity within the cover 314. In this embodiment the tray is exposed by a semi circular cut-out 316 in the cover 314. This cut-out permits the user a gripping area on the tray 312 to allow the user to slide the tray to an open position. The gripping area could be positioned anywhere along the perimeter of the book cover. FIG. 13 shows the tray 312 slid in the direction of the arrow to an open position allowing access and removal of the CD/DVD 314.

Figure 14:
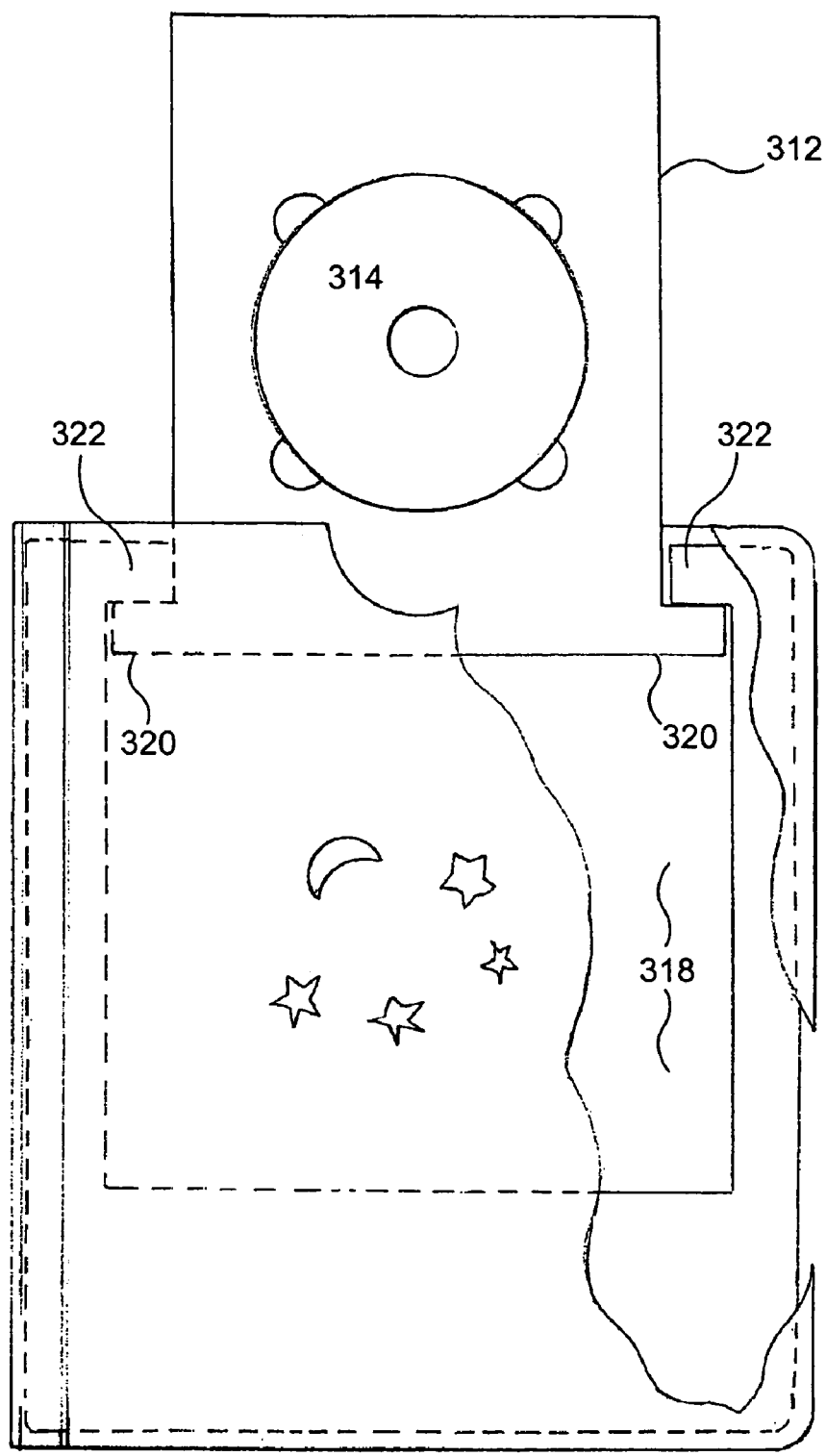
FIG. 14 is a partial assembly drawing and cut-away view of the embodiment shown in FIG. 12.

FIG. 14 shows a cut-away of the embodiment shown in FIG. 12. The figure shows the tray 312 in an open position and the cover's internal cavity 318 where the tray 312 is positioned when the tray is in the closed position. The tray 312 has protrusions 320 and the cover has protrusions 322 to prevent detachment of the tray from the book cover 314.

Although the slideable cover arrangement has been described by locating the CD holder in the front cover, it is further contemplated that the slideable cover arrangement may also be utilized in the back cover of the book or even both the front and the back covers of the book.

Further, although the CD holder has been illustrated as being accessible from the front or exterior of the book, it is further contemplated that the CD holder may allow access to the CD from the inside of the slideable cover. It is still further contemplated that to further increase CD storage the CD holder will facilitate placement of CDs from both the inside and the outside such that the CDs may be place in the CD holders in a back-to-back arrangement. This may be utilized in both the front and the back covers of the book. It is still further contemplated that multiple CDs may be located in the multiple CD holders in a stackable arrangement in which various CD holders can swing outward from a stacked arrangement to permit access to the various CDs.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A book for providing printed content to a user having a holding apparatus for a storage medium comprising:
   a storage medium holder for receiving at least one storage medium; and
   a book cover having an interior cavity for receiving said storage medium holder, said book cover being slideable from a closed to an open position and being slideable along a direction of movement such that when said book cover is displaced to an open position relative to a binding of the book, the at least one storage medium is accessible for removal from said storage medium holder and when said book cover is displaced to a closed position, said storage medium holder is received in the interior cavity of said book cover.

2. The book according to claim 1 further comprising a cutout located in said book cover, said cutout being situated such that at least a portion of the at least one storage medium may be seen through said cutout when said book cover is in the closed position.

3. The book according to claim 1 wherein said storage medium holder and said book cover both have protrusions such that when said book cover is displaced to the open position the storage medium holder protrusions and the book cover protrusions engage with each other so that said storage medium holder and said book cover are engagingly interlocked with each other.

4. The book according to claim 1 wherein said book cover further comprises a seam where one side of the slideable book cover meets the binding of the book when in the closed position.

5. The book according to claim 1 wherein said book cover further comprises a rigid material.

6. The book according to claim 5 wherein said book cover further comprises a covering around said rigid material.

7. A book having a holding apparatus for a storage medium comprising:
   a storage medium holder for receiving at least one storage medium; and
   a book cover having an interior cavity for receiving said storage medium holder, said book cover being slideable from a closed to an open position and being slideable along a direction of movement such that when said book cover is displaced to an open position relative to said storage medium holder, the at least one storage medium is accessible for removal from said storage medium holder and when said book cover is displaced to a closed position, said storage medium holder is received in the interior cavity of said book cover,
   wherein said book cover further comprises a covering around a rigid material, and
   wherein said book cover further comprises a padded material located between said rigid material and said covering.

8. The book according to claim 1 wherein said storage medium holder comprises a recess and a stem for detachably engaging with a hole in the center of the at least one storage medium.

9. A book comprising:
   a storage medium holder for receiving at least one storage medium;
   a cover having a first part and a second part, said first part having an interior cavity for receiving at least a portion of said storage medium holder therein; and
   said second part having said storage medium holder slideably attached thereto, said second part having an interior cavity for receiving at least a portion of said storage medium holder therein;
   wherein said storage medium holder is slideable along a direction of movement relative to said first part and said second part is slideable along a direction of movement relative to said storage medium holder such that when said second part and said storage medium holder are displaced to an open position, the at least one storage medium is accessible for removal from said storage medium holder and when said second part and said storage medium holder are displaced to a closed position, the at least one storage medium is received in the interior cavities of both said first and said second parts.

10. The book according to claim 9 wherein said first part further comprises a first edge and said second part further comprises a second edge, said first edge and said second edge meeting when said book cover is in the closed position.

11. The book according to claim 9 said storage medium holder, said first part and said second part each having protrusions, such that when said second part is displaced toward the open position the storage medium holder protrusions and the second part protrusions engage with each other so that said storage medium holder and said second part are engagingly interlocked with each other, and when said storage medium holder is displaced toward the open position the storage medium holder protrusions and the first part protrusions engage with each other so that said storage medium holder and said first part are engagingly interlocked with each other.

12. The book according to claim 11 wherein the at least one storage medium has an upper side having a design thereon, the design indicating the book it is associated with, wherein at least a portion of the upper side of the at least one storage medium may be seen through said cutout when said book cover is in the closed position.

13. The book according to claim 9 wherein said book cover further comprises a board material.

14. The book according to claim 13 wherein said book cover further comprises a plastic covering around said board material.

15. The book according to claim 14 wherein said book cover further comprises a padded material located between said board material and said plastic covering.

16. The book according to claim 9 wherein said storage medium holder comprises a recess and a stem for detachably engaging with a hole in the center of the at least one storage medium.

17. A Compact Disc holding apparatus for use with a book comprising:
a Compact Disc holder for receiving at least one Compact Disc;
a book cover having:
a first part connected at one side to a binding of a book and having said Compact Disc holder attached thereto;
a second part having said Compact Disc holder slideably attached thereto, said second part having an interior cavity for receiving at least a portion of said Compact Disc holder therein;
wherein said second part is slideable along a direction of movement relative to said Compact Disc holder such that when said second part is displaced to an open position, the at least one Compact Disc is accessible for removal from said Compact Disc holder and when said second part is displaced to a closed position, the at least one Compact Disc is received in the interior cavity of said second part.

18. The Compact Disc holding apparatus according to claim 17 further comprising a cutout located in said book cover, said cutout being situated along an edge of said first part and along an edge of said second part such that at least a portion of the at least one Compact Disc may be seen through said cutout when said book cover is in the closed position.

19. The Compact Disc holding apparatus according to claim 17 said Compact Disc holder, said first part and said second part each having protrusions, such that when said second part is displaced toward the open position the Compact Disc holder protrusions and the second part protrusions engage with each other so that said Compact Disc holder and said second part are engagingly interlocked with each other, and when said Compact Disc holder is displaced toward the open position the Compact Disc holder protrusions and the first part protrusions engage with each other so that said Compact Disc holder and said first part are engagingly interlocked with each other.

20. A book having a holding apparatus for a storage medium comprising:
a storage medium holder for receiving at least one storage medium;
a book cover having an interior cavity for receiving said storage medium holder, said storage medium holder being slideable from a closed to an open position and being slideable along a direction of movement such that when said storage medium holder is displaced to an open position relative to said book cover, the at least one storage medium is accessible for removal from said storage medium holder and when said storage medium is displaced to a closed position, said storage medium holder is received in the interior cavity of said book covers
a book binding;
a plurality of pages containing printed content; and
wherein each of said book cover and said plurality of pages are bound to said book binding.

21. A storage medium holding apparatus, comprising:
a storage medium holder for receiving at least one storage medium;
a first part comprising a base piece, a top piece and an interior cavity for receiving at least a portion of said storage medium holder therein;
a second part slideably attached to said storage medium holder comprising a base piece, a top piece and an interior cavity for receiving at least a portion of said storage medium holder therein;
wherein said storage medium holder is slideable along a direction of movement relative to said first part and said second part is slideable along a direction of movement relative to said storage medium holder such that when said second part and said storage medium holder are displaced to an open position, the at least one storage medium is accessible for removal from said storage medium holder and when said second part and said storage medium holder are displaced to a closed position, the at least one storage medium is received in the interior cavities of both said first and said second parts.

22. The storage medium holding apparatus according to claim 21, said storage medium holder, said first part and said second part each having protrusions, such that when said second part is displaced toward the open position the storage medium holder protrusions and the second part protrusions engage with each other so that said storage medium holder and said second part are engagingly interlocked with each other, and when said storage medium holder is displaced toward the open position the storage medium holder protrusions and the first part protrusions engage with each other so that said storage medium holder and said first part are engagingly interlocked with each other.

23. The storage medium holding apparatus according to claim 21, wherein each of said first and second parts further comprise at least one of a paperboard material, a plastic material, and a foam material.

24. The storage medium holding apparatus according to claim 21, wherein said at least one storage medium is one of a Compact Disc and a DVD.

25. A storage medium holding apparatus, comprising:
a tray comprising a storage medium holder for receiving at least one storage medium, the storage medium being one of a Compact Disc and a DVD;
a book cover having multiple layers including a base layer, a top layer, and at least one intermediate layer, the multiple layers being substantially parallel to one another; and
a cavity for receiving at least a portion of said tray therein, said cavity defined by the multiple layers;
wherein said tray is slideable along a direction of movement relative to said cavity such that when said tray is displaced to an open position, the at least one storage medium is accessible for removal from said storage medium holder and when said tray is displaced to a closed position, the at least one storage medium is received in said cavity;
wherein said tray further comprises at least two tray protrusions extending substantially perpendicular to the direction of movement and substantially parallel to the multiple layers; and
wherein said at least one intermediate layer comprises at least two cavity protrusions extending substantially perpendicular to the direction of movement such that when said tray is displaced toward the open position the cavity protrusions and the tray protrusions engage with each other so that said cavity and said tray are engagingly interlocked with each other.

26. The storage medium holding apparatus according to claim 25, wherein the multiple layers comprise one of a paperboard material and a plastic material.

27. The storage medium holding apparatus according to claim 25, wherein the at least two cavity protrusions comprise one of a paperboard material and a plastic material.

28. The storage medium holding apparatus according to claim 25, wherein the tray protrusions and the cavity protrusions are substantially the same size.

29. The book according to claim 1, wherein the at least one storage medium includes prerecorded media associated with the book.

30. The book according to claim 20, wherein the at least one storage medium includes prerecorded media associated with the book.

31. The book according to claim 20, wherein said book cover includes a base piece, an intermediate piece and a top piece defining the interior cavity, wherein the top piece has a height greater than a height of at least one of the base piece and the intermediate piece.

32. The storage medium holding apparatus according to claim 25, wherein said top layer has a height greater than a height of the base layer.

33. The book according to claim 1, wherein the storage medium holder is constructed within said book cover, wherein said book cover is bound about a plurality of pages providing printed content.

34. The book according to claim 20, wherein the storage medium holder is constructed within said book cover, wherein said book cover is bound about a plurality of pages providing printed content.

* * * * *